(12) United States Patent
Arao

(10) Patent No.: US 9,651,164 B2
(45) Date of Patent: May 16, 2017

(54) ELECTROMAGNETIC ACTUATOR

(71) Applicant: DENSO CORPORATION, Kariya, Aichi pref. (JP)

(72) Inventor: Masashi Arao, Obu (JP)

(73) Assignee: DENSO CORPORATION, Kariya (JP)

( * ) Notice: Subject to any disclaimer, the term of this patent is extended or adjusted under 35 U.S.C. 154(b) by 356 days.

(21) Appl. No.: 14/244,220

(22) Filed: Apr. 3, 2014

(65) Prior Publication Data
US 2014/0299804 A1 Oct. 9, 2014

(30) Foreign Application Priority Data

Apr. 8, 2013 (JP) .................................. 2013-080442

(51) Int. Cl.
*F16K 31/02* (2006.01)
*F16K 31/06* (2006.01)
(Continued)

(52) U.S. Cl.
CPC ........ *F16K 31/0675* (2013.01); *F01L 1/3442* (2013.01); *F02D 13/02* (2013.01);
(Continued)

(58) Field of Classification Search
CPC . F16K 31/0675; F01L 1/3442; F01L 2101/00; F01L 2001/34433;
(Continued)

(56) References Cited

U.S. PATENT DOCUMENTS

| 7,959,128 B2* | 6/2011 | Hoppe ................. F01L 1/3442 251/129.07 |
| 8,427,263 B2* | 4/2013 | Hoppe .................... H01F 7/081 335/255 |

(Continued)

FOREIGN PATENT DOCUMENTS

| DE | 10 2010 060 180 | 4/2012 |
| JP | 2002-310322 | 10/2002 |

(Continued)

OTHER PUBLICATIONS

Office Action (2 pages) dated Feb. 3, 2015, issued in corresponding Japanese Application No. 2013-080442 and English translation (2 pages).

*Primary Examiner* — Craig Schneider
*Assistant Examiner* — Andrew J Rost
(74) *Attorney, Agent, or Firm* — Nixon & Vanderhye P.C.

(57) ABSTRACT

An electromagnetic actuator, which is arranged at a position opposing to a hydraulic control valve, has a movable-core chamber for movably accommodating a movable core and an air breathing passage for communicating the movable-core chamber to the atmosphere. An inside opening of the air breathing passage is formed in an inner wall of the movable-core chamber, while an outside opening of the air breathing passage is formed in an outer wall of the actuator, which is in contact with the atmosphere. The outside opening is formed at such a position out of an oil-splashing area, to which oil discharged from an oil-discharge port of the hydraulic control valve is directly splashed. According to the (Continued)

above structure, it is possible to prevent the oil discharged from the oil-discharge port from rushing into the movable-core chamber through the air breathing passage.

11 Claims, 11 Drawing Sheets

(51) Int. Cl.
    *F02D 13/02*     (2006.01)
    *F01L 1/344*     (2006.01)

(52) U.S. Cl.
    CPC ............... *F01L 2001/3443* (2013.01); *F01L 2001/34433* (2013.01); *F01L 2001/34469* (2013.01); *F01L 2101/00* (2013.01); *F01L 2810/02* (2013.01)

(58) Field of Classification Search
    CPC ........... F01L 2810/02; F01L 2001/3443; F01L 2001/34469; F02D 13/02

USPC ........................................ 251/129.15; 310/14
See application file for complete search history.

(56) References Cited

U.S. PATENT DOCUMENTS

| | | | |
|---|---|---|---|
| 8,534,247 B2* | 9/2013 | Hori | ............... F01L 1/3442 |
| | | | 123/90.17 |
| 2007/0152790 A1 | 7/2007 | Telep | |
| 2008/0245983 A1 | 10/2008 | Hoppe et al. | |
| 2012/0199086 A1 | 8/2012 | Hori et al. | |
| 2014/0026836 A1 | 1/2014 | Matsumoto et al. | |

FOREIGN PATENT DOCUMENTS

| | | |
|---|---|---|
| JP | 2003-056737 | 2/2003 |
| JP | 2005-45217 | 2/2005 |
| JP | 2009-511837 | 3/2009 |
| JP | 2009-281453 | 12/2009 |
| JP | 2012-163050 | 8/2012 |

* cited by examiner

ELECTROMAGNETIC ACTUATOR

CROSS REFERENCE TO RELATED APPLICATION

This application is based on Japanese Patent Application No. 2013-080442 filed on Apr. 8, 2013, the disclosure of which is incorporated herein by reference.

FIELD OF TECHNOLOGY

The present disclosure relates to an electromagnetic actuator, which is used for a valve timing control device of an internal combustion engine.

BACKGROUND

An electromagnetic actuator for driving a hydraulic control valve, which is provided in a rotational center of a valve timing control device for an internal combustion engine, is known in the art.

In a prior art, for example, disclosed in German Patent Publication DE 10 2010 060 180 A1, an electromagnetic actuator is provided at a position opposing to a hydraulic control valve and a rod connected to a movable core pushes a spool of the hydraulic control valve when electric power is supplied to an electromagnetic coil. On the other hand, when the electric power supply to the electromagnetic coil is cut off, the rod is returned to its initial position by a spring force of a spring provided in the hydraulic control valve.

In the electromagnetic actuator, an air breathing passage is formed in an outer wall of the hydraulic control valve so as to communicate a movable-core chamber (in which a movable core is accommodated) to the atmosphere. Since air passes through the air breathing passage, the air in the movable-core chamber does not prevent a smooth movement of the movable core.

In the hydraulic control valve driven by the electromagnetic actuator of the above prior art, an oil-discharge port is formed on a side to the electromagnetic actuator. According to such a structure, a structure for hydraulic passages of the hydraulic control valve is simplified and pressure loss of the oil flowing through the hydraulic passages can be decreased in order to enhance response of the hydraulic control valve.

On the other hand, the electromagnetic actuator of the above prior art has an air breathing passage at such an area, to which the oil discharged from the oil-discharge port of the hydraulic control valve is directly poured. Therefore, it may become a problem that the oil from the oil-discharge port and/or extraneous material contained in the oil directly flows into the movable-core chamber through the air breathing passage.

In such a case, namely, when the high-pressure oil injected from the oil-discharge port rushes into the movable-core chamber through the air breathing passage, the movable core is pushed by such rushed-in oil in a direction opposite to the hydraulic control valve. As a result, it may become difficult for a rod fixed to the movable core to keep its force for pushing the hydraulic control valve.

In addition, when temperature becomes lower, viscosity of the oil from the oil-discharge port becomes higher. When the oil of a grease-like condition flows into the movable-core chamber through the air breathing passage, sliding resistance between the movable core and an inner wall of the movable-core chamber becomes larger. Furthermore, when an amount of the oil flowing into the movable-core chamber is increased, and when an amount of the extraneous material contained in the oil and flowing into the movable-core chamber is correspondingly increased, it may become a problem that a sliding movement of the movable core is adversely affected by such oil and/or the extraneous material.

SUMMARY OF THE DISCLOSURE

The present disclosure is made in view of the above problems. It is an object of the present disclosure to provide an electromagnetic actuator for driving a hydraulic control valve, wherein reliability of the actuator is increased.

According to a feature of the present disclosure, an electromagnetic actuator is arranged at a position opposing to a hydraulic control valve and has an air breathing passage for communicating a movable-core chamber to the atmosphere. An outside opening of the air breathing passage is formed in an outer wall of the actuator at such a position out of an oil-splashing area, to which oil discharged from an oil-discharge port of the hydraulic control valve is directly splashed.

According to the above feature, it is possible to prevent the oil of high pressure injected from the oil-discharge port from rushing into the movable-core chamber through the air breathing passage. It is, therefore, possible that a rod fixed to a movable core maintains its force for pushing the hydraulic control valve.

It is also possible to prevent the oil of a grease-like condition from flowing into the movable-core chamber through the air breathing passage, even when viscosity of the oil is increased at a low surrounding temperature. Accordingly, it is possible to avoid a situation that sliding resistance between the movable core and a fixed core is increased due to higher viscosity of the oil. It is, therefore, possible to keep a high response of the movable core with respect to electric power supply to an electromagnetic coil.

In addition, since an increase of amount of the oil flowing into the movable-core chamber is prevented, it is possible to suppress an increase of amount of the extraneous material contained in the oil and flowing into the movable-core chamber. As a result, the sliding resistance between the movable core and the fixed core is decreased to thereby increase reliability of the electromagnetic actuator for driving the hydraulic control valve.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

Figure 1:
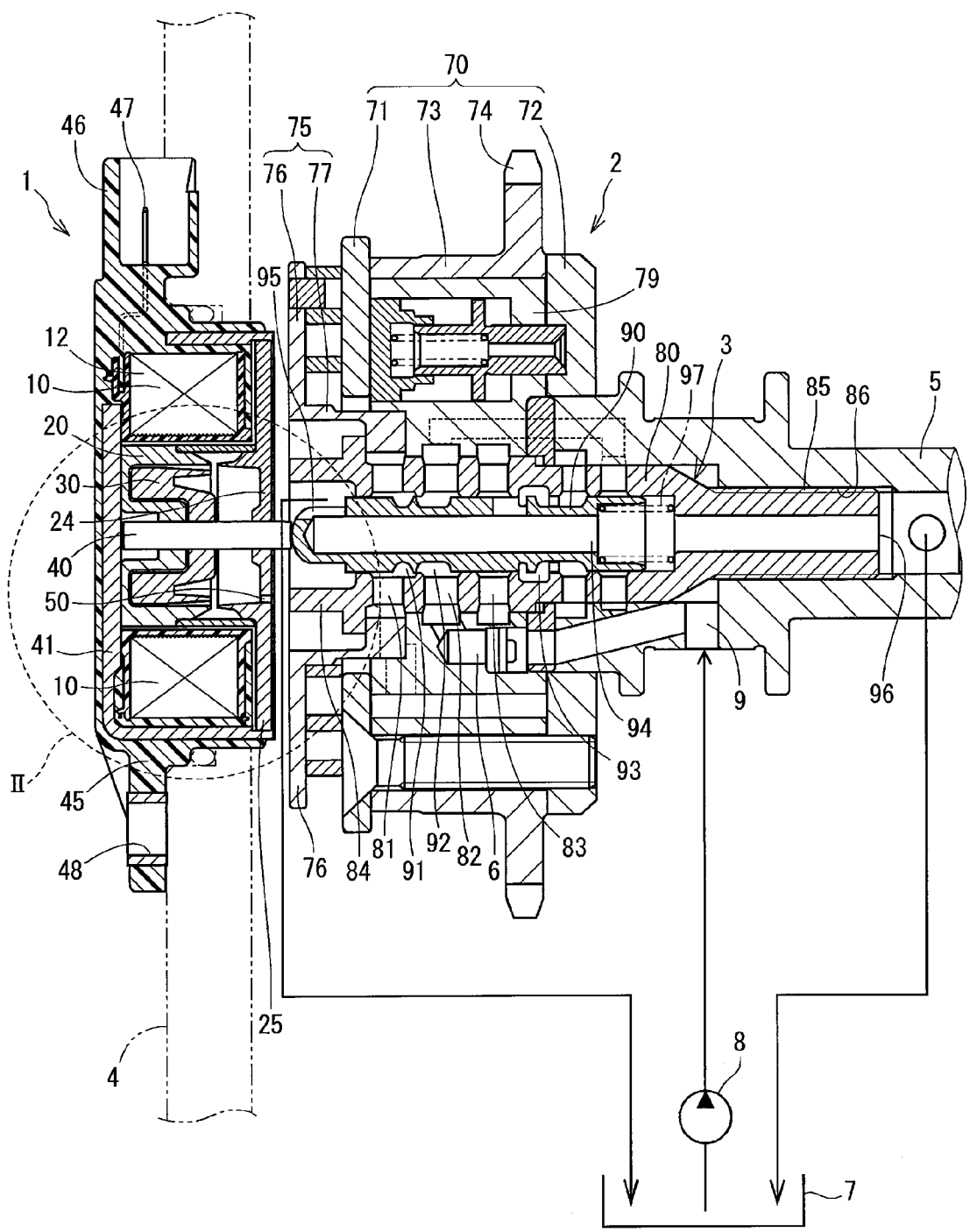
FIG. 1 is a schematic cross sectional view showing an electromagnetic actuator, a valve timing control device and a hydraulic control valve according to a first embodiment of the present disclosure.

The present disclosure will be explained hereinafter by way of multiple embodiments. The same reference numerals are given to the same or similar portions and/or structures throughout the embodiments, for the purpose of eliminating repeated explanation.

First Embodiment

Figure 2:
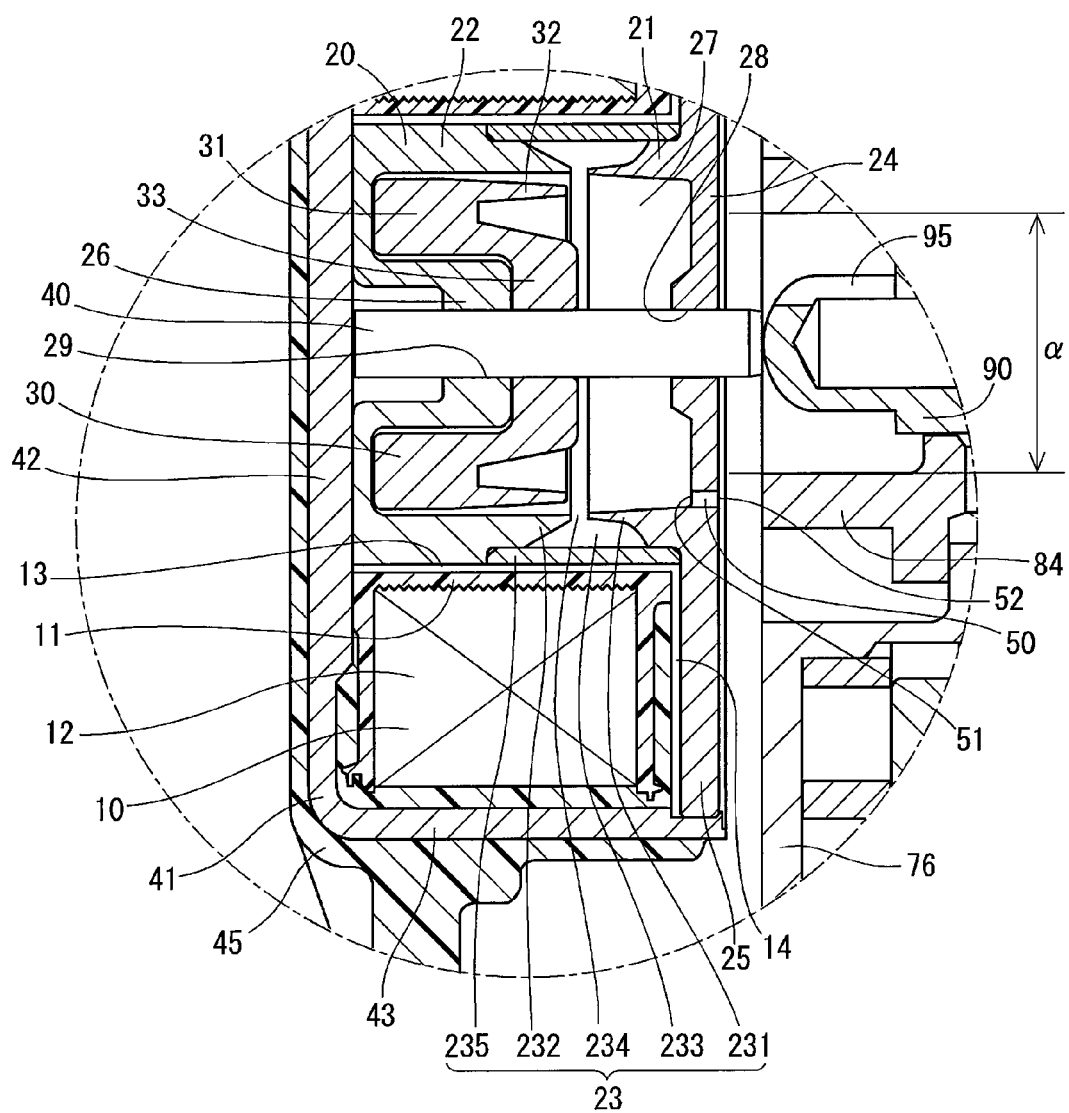
FIG. 2 is a schematically enlarged cross sectional view showing a portion II in FIG. 1.
Figure 3:
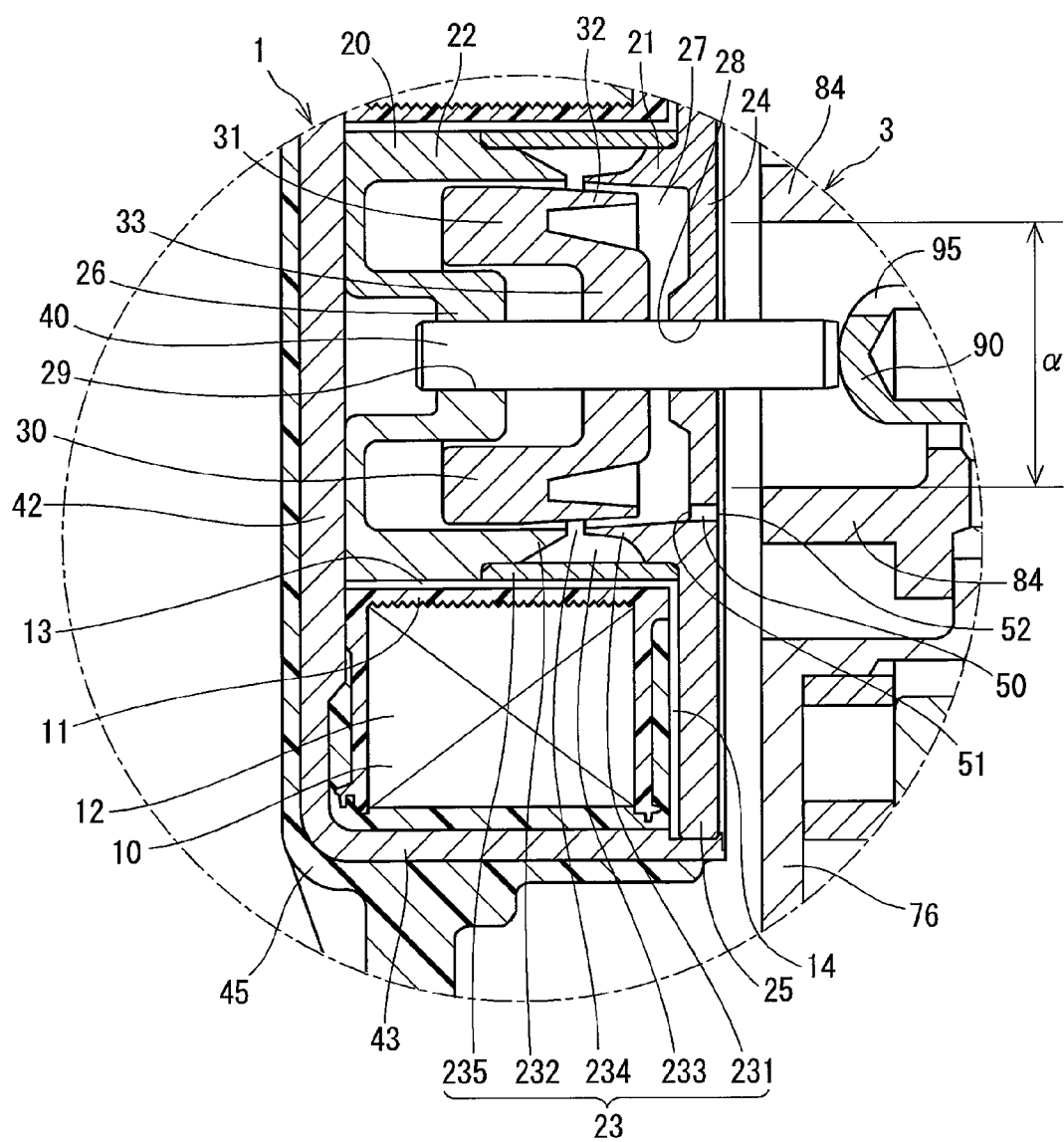
FIG. 3 is a schematically enlarged cross sectional view showing the portion II in FIG. 1 in a condition that electric power is supplied to an electromagnetic coil.

An electromagnetic actuator 1 according to a first embodiment of the present disclosure is shown in FIGS. 1 to 3. The electromagnetic actuator 1 (hereinafter, the actuator 1) is provided at a position opposing to a hydraulic control valve 3, which is fixed to a rotational center of a valve timing control device 2, in order to drive the hydraulic control valve 3.

The valve timing control device 2 is rotated in synchronism with a crank shaft of an internal combustion engine and rotated together with a cam shaft 5. Working fluid is supplied to the valve timing control device 2 via the hydraulic control valve 3, so that the valve timing control device 2 controls a relative rotational phase between the crank shaft and the cam shaft 5.

A structure of the actuator 1 will be explained at first. The actuator 1 is composed of an electromagnetic coil 10 (hereinafter, the coil 10), a fixed core 20, a movable core 30, a rod 40, a yoke 41, a molded body 45, an air breathing passage 50 and so on.

The coil 10 is composed of a bobbin 11 and a winding 12 wound on the bobbin 11. The coil 10 generates electromagnetic field when electric power is supplied to the winding 12 via a terminal 47 of a connector 46, which is formed in the molded body 45.

The fixed core 20 is made of magnetic material and composed of a first cylindrical member 21, a second cylindrical member 22, a magnetic-flux restricting portion 23, a cover portion 24 for closing an axial end of the first cylindrical member 21 on a side to the hydraulic control valve 3 (a right-hand axial end in FIGS. 1 to 3), a flanged portion 25 extending from the cover portion 24 in a radial outward direction, and a rod supporting portion 26 for movably supporting the rod 40 in an axial direction thereof.

In the present disclosure, the first cylindrical member 21, the second cylindrical member 22 and the magnetic-flux restricting portion 23 are collectively referred to as a cylindrical portion.

A movable-core chamber 27 is formed in an inside of the cylindrical portion 21-23 (being composed of the first cylindrical member 21, the second cylindrical member 22 and the magnetic-flux restricting portion 23), in which the movable core 30 is movably accommodated. A gap 13 of a cylindrical shape extending in the axial direction is formed between the cylindrical portion 21-23 and the bobbin 11 of the coil 10 in a radial direction of the actuator 1.

The first cylindrical member 21 is integrally formed with the cover portion 24 and the flanged portion 25 at an axial end of the first cylindrical member 21, which is located on the side to the hydraulic control valve 3.

The second cylindrical member 22 is integrally formed with the rod supporting member 26 at an axial end of the second cylindrical member 22, which is located on a side opposite to the hydraulic control valve 3.

The magnetic-flux restricting portion 23 is composed of a first thin-walled portion 231 formed in the first cylindrical member 21 on the side to the second cylindrical member 22, a second thin-walled portion 232 formed in the second cylindrical member 22 on the side to the first cylindrical member 21, a space 233 formed between the first and second thin-walled portions 231 and 232, a gap 234 formed between the first and second cylindrical members 21 and 22, and a ring member 235 made of non-magnetic material. The ring member 235 coaxially connects the first and second cylindrical members 21 and 22 with each other. The magnetic-flux restricting portion 23 increases magnetic resistance between the first and second cylindrical members 21 and 22 to thereby increase magnetic flux passing through the movable core 30.

The cover portion 24 is opposed to an oil-discharge port 95 formed in the hydraulic control valve 3. In FIG. 2, a circular area, into which oil is discharged from the oil-discharge port 95, is indicated by "α". The hydraulic control valve 3 is rotated together with the valve timing control device 2. Therefore, the circular area "α", to which the oil discharged from the oil-discharge port 95 is directly poured, is formed in a circular shape formed in an inside of a head portion 84 of a sleeve 80 (explained below). In FIG. 2, "α" designates a diameter of the circular area.

The flanged portion 25 extends from the cover portion 24 in a radial-outward direction like a disc shape, so as to cover an axial end of the coil 10 on a side to the hydraulic control valve 3. A gap 14 extending in a radial direction is formed between the bobbin 11 of the coil 10 and the flanged portion 25.

The movable core 30 is made of magnetic material and movably accommodated in the movable-core chamber 27, so that the movable core 30 is movable in the axial direction. The movable core 30 has a magnetic-flux transmitting portion 31 formed inside of the second cylindrical member 22, an attracting portion 32 formed in a cylindrical shape and extending from an outer periphery of the magnetic-flux transmitting portion 31 in a direction toward the hydraulic control valve 3, and a rod fixing portion 33 for fixing the rod 40.

The rod 40 is fixed to the rod fixing portion 33 of the movable core 30 and movable in the axial direction together with the movable core 30. The rod 40 is movably supported by a through-hole 28 formed in the cover portion 24 and another through-hole 29 formed in the rod supporting portion 26 of the fixed core 20, so that the rod 40 is movable in the axial direction. The rod 40 pushes a spool 90 of the hydraulic control valve 3 when the electric power is supplied to the coil 10.

The yoke 41 is made of magnetic material and formed in a cylindrical shape having a bottom. The yoke 41 has a bottom portion 42 and a cylindrical wall portion 43. The bottom portion 42 is in contact with an axial end of the fixed core 20 on an a side opposite to the hydraulic control valve 3, so as to cover another axial end of the coil 10 on a side opposite to the hydraulic control valve 3. The cylindrical wall portion 43 extends from an outer periphery of the bottom portion 42 in a direction toward the hydraulic control valve 3 and its forward end is connected to an outer periphery of the flanged portion 25. The yoke 41 forms a magnetic circuit together with the fixed core 20 and the movable core 30.

The molded body 45 is made of resin, wherein an outer wall of the yoke 41 and a part of the coil 10 is integrally molded with the resin. The molded body 45 is fixed to an engine cover 4 by bolts (not shown) inserted through bolt holes 48.

The air breathing passage 50 penetrates through the cover portion 24 of the fixed core 20 in order to communicate the movable-core chamber 27 to the atmosphere (an outside of the actuator 1). One of opening ends of the air breathing passage 50, that is, an inside opening end 51, is formed at an inner wall of the movable-core chamber 27 at a lower-most position in a vertical direction (a direction of gravitational force), while the other of the opening ends (that is, an outside opening 52) is formed at an outer wall of the cover portion 24. More exactly, the outside opening 52 of the air breathing passage 50 is formed at a position out of the circular area "α", to which the oil discharged from the oil-discharge port 95 of the hydraulic control valve 3 is directly splashed. The area, to which the oil from the oil-discharge port 95 is directly splashed (including the circular area "α"), is also referred to as an oil splashing area.

When the movable core 30 moves back and forth in the movable-core chamber 27, air is discharged from the chamber 27 to the outside or draws air from the outside into the chamber 27 through the air breathing passage 50.

In addition, the oil discharged from the oil-discharge port 95 flows down on the outer wall of the cover portion 24 around the outside opening 52 of the air breathing passage 50. Therefore, when the movable core 30 reciprocates in the movable-core chamber 27, apart of the oil is drawn into the movable-core chamber 27 together with the air through the air breathing passage 50.

Furthermore, deteriorated oil as well as extraneous material can be discharged from the movable-core chamber 27 to the outside through the air breathing passage 50.

An operation of the actuator 1 will be explained. FIG. 2 shows the relevant portions of the actuator 1 in a condition in which electric power supply to the coil 10 is cut off. When the electric power is supplied to the winding 12 of the coil 10 via the terminal 47 of the connector 46, the coil 10 generates magnetic field. As a result, magnetic flux passes through a magnetic circuit, which is formed by the fixed core 20, the movable core 30 and the yoke 41. Due to the magnetic-flux restricting portion 23, the magnetic flux passing from the second cylindrical member 22 to the first cylindrical member 21 via the movable core 30 is increased.

As a result, as shown in FIG. 3, the attracting portion 32 of the movable core 30 is magnetically attracted toward the first cylindrical member 21. Then, the rod 40 fixed to the movable core 30 pushes the spool 90 of the hydraulic control valve 3.

Magnetic attracting force between the movable core 30 and the first cylindrical member 21 varies depending on electric current supplied to the coil 10. The movable core 30 is stopped at a position, at which the magnetic attracting force between the movable core 30 and the first cylindrical member 21 is balanced with a spring force of a spring 97 of the hydraulic control valve 3, wherein the spring force biases the rod 40 in a direction opposite to the hydraulic control valve 3 via the spool 90 of the hydraulic control valve 3.

When the movable core 30 moves in the movable-core chamber 27 in the direction toward the hydraulic control valve 3, the air is discharged from the movable-core chamber 27 to the outside through the air breathing passage 50. In this operation, the deteriorated oil as well as the extraneous material is also discharged from the movable-core chamber 27 to the outside together with the air through the air breathing passage 50.

When the electric power supply to the winding 12 of the coil 10 is cut off, the movable core 30 and the rod 40 return to their initial positions by the spring force of the spring 97 of the hydraulic control valve 3, as shown in FIG. 2.

In this operation, the air is drawn into the movable-core chamber 27 through the air breathing passage 50. At the same time, a part of the oil flowing down on the outer wall of the cover portion 24 around the outside opening 52 of the air breathing passage 50 is supplied into the movable-core chamber 27 together with the air.

Now, the valve timing control device 2 and the hydraulic control valve 3 will be explained.

The valve timing control device 2 transmits the rotation of the crank shaft of the engine (not shown) to the cam shaft 5, which operates an intake valve and/or an exhaust valve. The valve timing control device 2 changes a relative rotational phase between the crank shaft and the cam shaft 5.

As shown in FIG. 1, the valve timing control device 2 is composed of a housing 70, a front cover 75, a vane rotor 79 and so on.

The housing 70 is composed of a front plate 71, a rear plate 72 and a cylindrical wall 73. A gear 74 formed at the cylindrical wall 73 is connected to the crank shaft of the engine via a chain (not shown), so that the housing 70 is rotated in synchronism with the crank shaft.

The front cover 75 is provided at an axial end side of the front plate 71, which is on a side to the actuator 1. The front cover 75 has a plate portion 76 of a disc shape and a cylindrical recessed portion 77, which is recessed from the plate portion 76 in a direction toward the cam shaft 5.

The plate portion 76 of the disc shape is arranged at a position in parallel to the flanged portion 25 of the actuator 1. The head portion 84 of the sleeve 80 of the hydraulic control valve 3 is inserted into an inside of the cylindrical recessed portion 77. The head portion 84 of the sleeve 80 is formed in a cylindrical shape having a bottom. A male screw 85 is formed on an outer periphery of the sleeve 80 on a side opposite to the head portion 84. The male screw 85 is engaged with a female screw 86 formed in an inner periphery of the cam shaft 5, so that the sleeve 80, the front cover 75 and the vane rotor 79 are fixed to the cam shaft 5.

The vane rotor 79 is accommodated in an inside of the housing 70. The vane rotor 79 is fixed to an axial end of the cam shaft and rotated together with the cam shaft 5. The vane rotor 79 divides an oil chamber formed in the housing 70 into multiple advancing chambers and retarding chambers (not shown). The vane rotor 79 is relatively rotated with respect to the housing 70 either in an advancing direction or in a retarding direction, depending on pressure of oil supplied to the advancing or the retarding chambers. Accordingly, the valve timing control device 2 changes the relative rotational phase between the crank shaft and the cam shaft 5.

The hydraulic control valve 3 is fixed to a rotational center of the valve timing control device 2 and rotated together with the valve timing control device 2. The hydraulic control valve 3, which is composed of the sleeve 80, the spool 90, the spring 97 and so on, switches the oil pressure to be supplied to the advancing or the retarding chambers of the valve timing control device 2.

The sleeve 80 is formed in a cylindrical shape and has multiple oil pressure ports 81, 82 and 83, which are formed in the axial direction of the sleeve 80. Each of the oil pressure ports 81, 82 and 83 has multiple holes extending in radial directions and arranged in a circumferential direction of the sleeve 80. Each of the oil pressure ports 81, 82 and 83 is communicated to the advancing chambers, the retarding chambers and an oil-supply passage 6 of the valve timing control device 2.

The spool 90 is movably provided in an inside of the sleeve 80 so that the spool 90 is reciprocated in the axial direction. The spool 90 has multiple oil passages 91, 92 and 93 at an outer periphery of the spool 90. The oil passages 91, 92 and 93 correspond to the oil pressure ports 81, 82 and 83. The spool 90 further has an oil discharge passage 94 extending in the axial direction and the oil-discharge port 95 at one axial end and another oil-discharge port 96 at another axial end of the spool 90. The oil-discharge port 95 formed on the side to the actuator 1 is opened to an inside space of the head portion 84 of the cylindrical shape with the bottom. The spring 97 biases the spool 90 in the direction toward the actuator 1.

An operation of the valve timing control device 2 and the hydraulic control valve 3 will be explained.

The oil (the working fluid), which is lifted up by an oil pump 8 from an oil pan 7 of the engine, is supplied to either one of the advancing chambers and the retarding chambers via an oil inlet port 9 of the cam shaft 5, the oil-supply passage 6 of the valve timing control device 2, the oil pressure ports 81, 82 and 83 and the oil passages 91, 92 and 93 of the hydraulic control valve 3. In this operation, the oil in the other of the advancing chambers or the retarding chambers is discharged from the oil-discharge port 95 to the side to the actuator 1 via the oil pressure ports 81 and/or 83.

When the valve timing control device 2 and the hydraulic control valve 3 are operated at high temperature, the oil discharged from the oil-discharge port 95 is injected at high pressure toward the cover portion 24 of the fixed core 20. Since the hydraulic control valve 3 is rotated together with the valve timing control device 2, the oil injected from the oil-discharge port 95 is splashed to the cover portion 24 in an inner area surrounded by the head portion 84 of the spool 80 (that is, the oil splashing area).

On the other hand, viscosity of the oil is increased when the temperature is decreased. Therefore, in the operation at such low temperature, the oil discharged from the oil-discharge port 95 remains between the head portion 84 and the cover portion 24 in the inner area surrounded by the head portion 84. In some of cases, extraneous material, which has been discharged from sliding portions of the valve timing control device 2 and/or sliding portions of the hydraulic control valve 3, may be contained in the oil.

The oil discharged from the oil-discharge port 95 flows down in a space between the cover portion 24 and the flanged portion 25 of the actuator 1 and the disc-shaped plate portion 76 of the front cover 75. Then, the oil returns to the oil pan 7.

The actuator 1 according to the above embodiment has the following advantages.

(1) In the first embodiment, the outside opening 52 of the air breathing passage 50 is formed in the outer wall of the fixed core 20 at such a position out of the circular area "α" (the oil splashing area), to which the oil discharged from the oil-discharge port 95 of the hydraulic control valve 3 is directly splashed.

According to the above structure, in the operation at the high temperature, it is possible to prevent the oil discharged from the oil-discharge port 95 from rushing into the movable-core chamber 27 through the air breathing passage 50. It is, therefore, possible that the rod 40 extending from the movable core 30 maintains a force for pushing the spool 90 of the hydraulic control valve 3.

In the operation at the low temperature, in which the viscosity of the oil discharged from the oil-discharge port 95 is increased, it is possible to prevent the oil from flowing into the movable-core chamber 27 through the air breathing passage 50, wherein the oil is in a grease-like condition. It is, therefore, possible to prevent sliding resistance for the movable core 30 from being increased by the oil of the high viscosity. As a result, it is possible to maintain response of the movable core 30 with respect to the electric power supply to the coil 10.

In addition, it is possible to prevent a large amount of the oil from flowing into the movable-core chamber 27 through the air breathing passage 50. It is, therefore, possible to decrease an amount of the extraneous material contained in the oil from flowing into the movable-core chamber 27. As a result, it is possible to decrease the sliding resistance between the movable core 30 and the fixed core 20 and to thereby increase reliability of the actuator 1 for operating the hydraulic control valve 3.

(2) In the above first embodiment, the inside opening 51 of the air breathing passage 50 is formed in the inner wall of the movable-core chamber 27 at such the lower-most position in the direction of gravitational force. The position of the inside opening 51 corresponds to a position, which is out of the circular area "α" (the oil splashing area) to which the oil from the oil-discharge port 95 is directly poured, and which is located at a lower side of the circular area "α" in the direction of gravitational force.

According to the above structure, it is possible to discharge the deteriorated oil as well as the extraneous material from the movable-core chamber 27 to the outside through the air breathing passage 50. It is also possible to draw the part of the oil, which flows down along the cover portion 24 across the outside opening 52 of the air breathing passage 50, into the movable-core chamber 27 by the reciprocal movement of the movable core 30.

In the following multiple embodiments, the same advantages to the first embodiment can be obtained.

Second Embodiment

Figure 4:
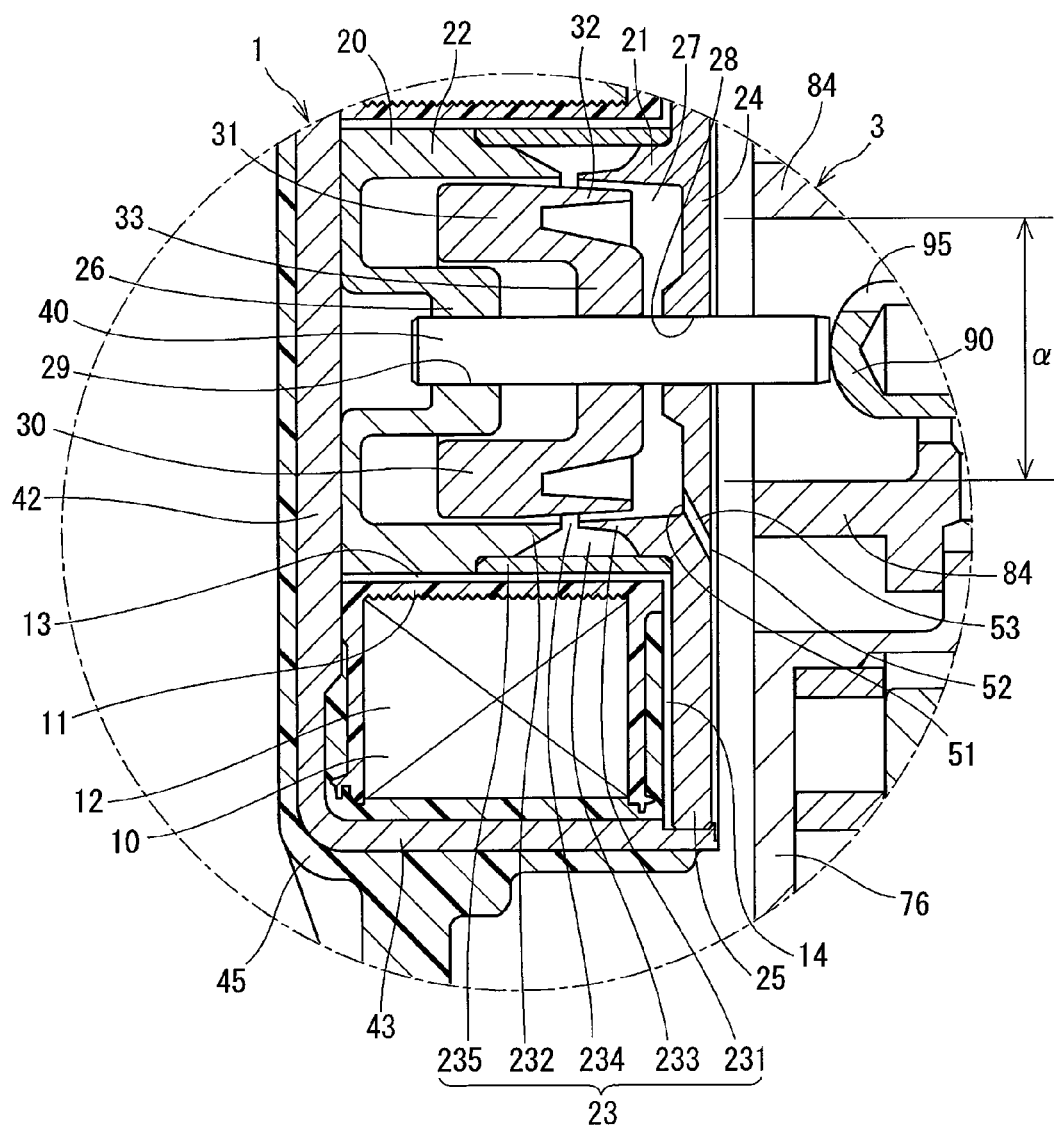
FIG. 4 is a schematic cross sectional view showing relevant portions of an electromagnetic actuator according to a second embodiment of the present disclosure.

An electromagnetic actuator according to a second embodiment will be explained with reference to FIG. 4.

In the actuator of the second embodiment, an air breathing passage 53 is declined to the lower side in the direction of gravitational force, when the air breathing passage 53 extends from the inner wall of the movable-core chamber 27 toward the outside of the actuator (that is, from the inside opening 51 to the outside opening 52). Therefore, the outside opening 52 is located at a position lower than that of the inside opening 51 in the direction of gravitational force.

The outside opening 52 of the air breathing passage 53 is located at such a position, which is further away from the circular area "α" (the oil splashing area), to which the oil discharged from the oil-discharge port 95 of the hydraulic control valve 3 is directly splashed, than the outside opening 52 of the first embodiment.

The oil discharged from the oil discharge-port 95 becomes closer to the atmospheric pressure, as the oil is more separated from the oil-discharge port 95. It is, therefore, possible to control the amount of the oil to be drawn into the movable-core chamber 27 through the air breathing passage 53, when adjusting the position of the outside opening 52 of the air breathing passage 53.

In the above second embodiment, the outside opening 52 of the air breathing passage 53 is located at the position lower than that of the inside opening 51 in the direction of gravitational force.

According to the above structure, such extraneous material having a larger mass than that of the oil more hardly enters the movable-core chamber 27 because of its gravity, when the oil discharged from the oil-discharge port 95 is drawn into the movable-core chamber 27 through the air breathing passage 53. In addition, the deteriorated oil as well as the extraneous material can be more easily discharged from the movable-core chamber 27 to the outside. As a result, the movement of the movable core 30 can be more assured to thereby increase the reliability of the actuator 1.

Third Embodiment

Figure 5:
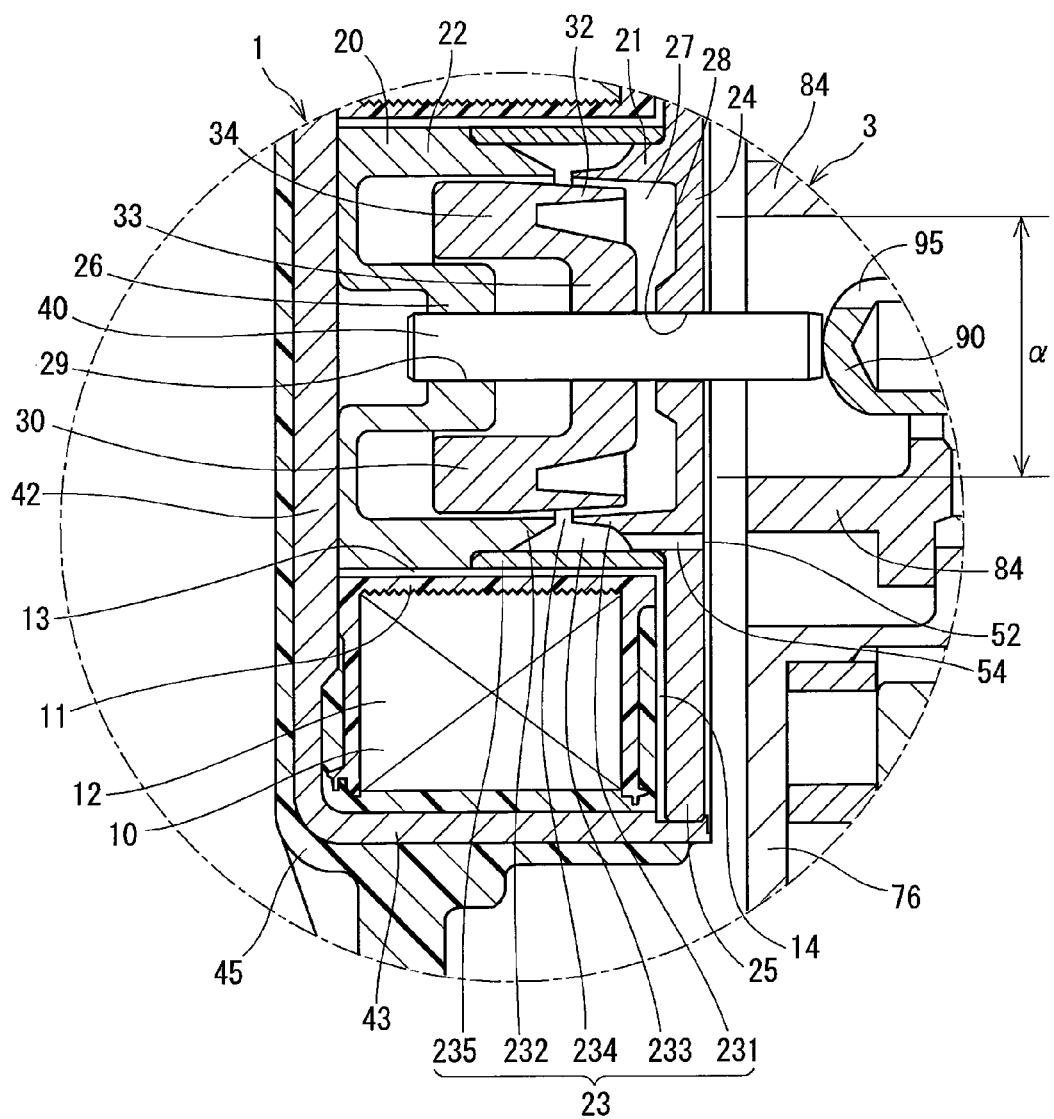
FIG. 5 is a schematic cross sectional view showing relevant portions of an electromagnetic actuator according to a third embodiment of the present disclosure.

An electromagnetic actuator according to a third embodiment will be explained with reference to FIG. 5.

In the third embodiment, an air breathing passage is composed of the gap 234 between the first and second cylindrical members 21 and 22, the space 233 between the first and second thin-walled portions 231 and 232, and a through-hole 54 penetrating through the first cylindrical member 21 in the axial direction.

In the present disclosure, the gap 234 between the first and second cylindrical members 21 and 22 is also referred to as a first passage portion, the space 233 between the first and second thin-walled portions 231 and 232 is also referred to as a communicating passage portion, and the through-hole 54 penetrating through the first cylindrical member 21 in the axial direction is also referred to as a second passage portion.

In addition, an opening end of the gap 234 on a side to the movable-core chamber 27 is also referred to as an inside opening portion. An opening end of the through-hole 54 on a side to the atmosphere (the outside of the actuator 1) is also referred to as an outside opening portion. The outside opening portion of the air breathing passage corresponds to the outside opening 52.

In the third embodiment, the oil discharged from the oil-discharge port 95 and flowing down along the cover portion 24 across the outside opening 52 flows into the movable-core chamber 27 via the through-hole 54, the space 233 formed between the first and second thin-walled portions 231 and 232 and the gap 234 formed between the first and second cylindrical members 21 and 22.

The deteriorated oil as well as the extraneous material is discharged from the movable-core chamber 27 to the outside of the actuator 1 via a reversed path of the above air breathing passage.

In the third embodiment, the space 233 formed between the first and second thin-walled portions 231 and 232 and the gap 234 formed between the first and second cylindrical members 21 and 22 are utilized as a part of the air breathing passage. As a result, the air breathing passage is elongated. At the same time, man-hour for processing the air breathing passage can be reduced.

In the third embodiment, as a result of elongating the air breathing passage, the extraneous material contained in the oil cannot easily flow into the movable-core chamber 27 because of friction between the extraneous material and an inner wall of the air breathing passage, when the oil discharged from the oil-discharge port 95 is drawn into the movable-core chamber 27 through the air breathing passage.

In addition, in the third embodiment, the extraneous material of magnetic material can be absorbed by magnetic force on radial-outward surfaces of the first and second thin-walled portions 231 and 232, when the oil flows through the space 233 formed between the first and second thin-walled portions 231 and 232.

Fourth Embodiment

Figure 6:
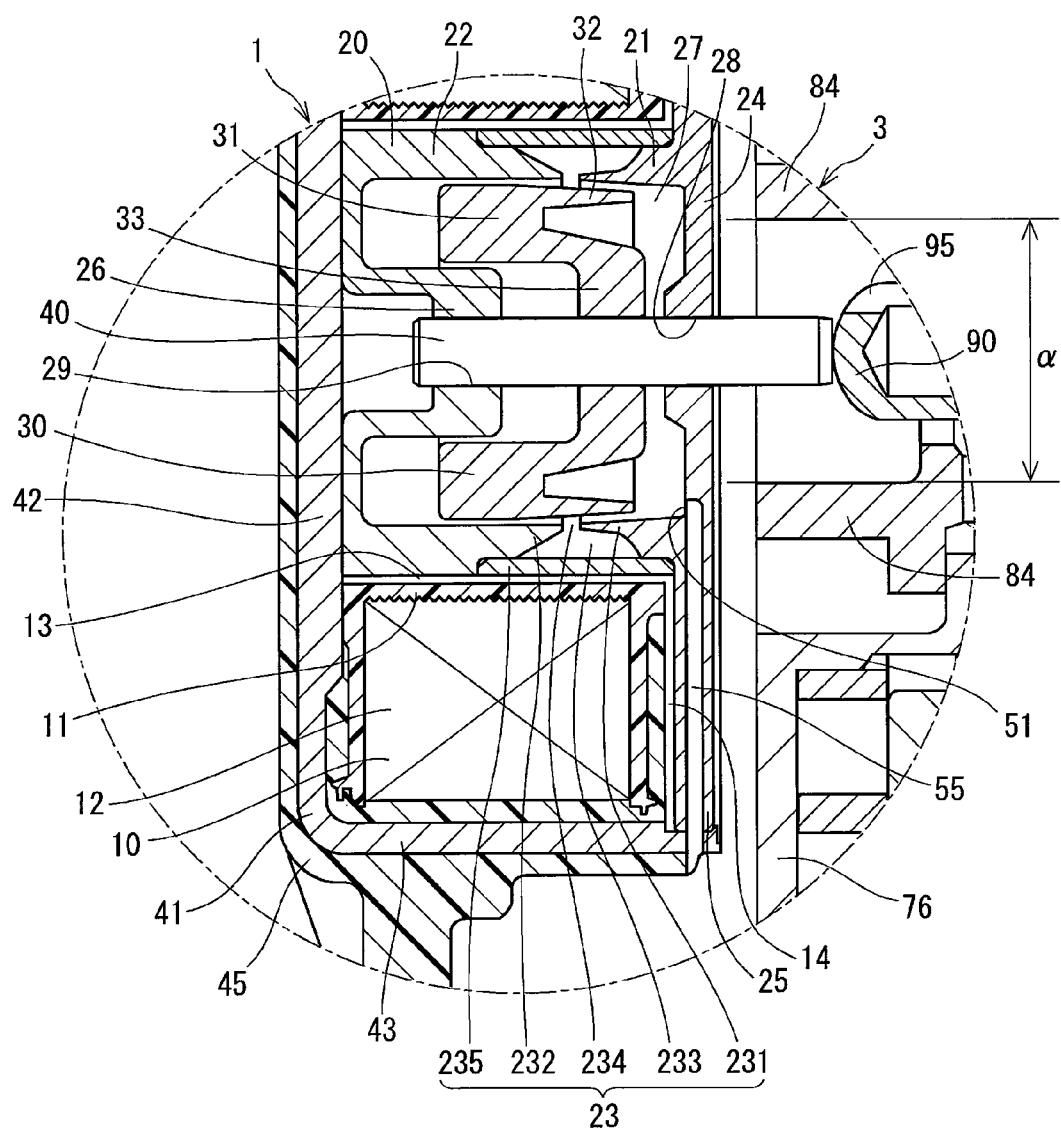
FIG. 6 is a schematic cross sectional view showing relevant portions of an electromagnetic actuator according to a fourth embodiment of the present disclosure.

An electromagnetic actuator according to a fourth embodiment will be explained with reference to FIG. 6.

In the fourth embodiment, an air breathing passage 55 penetrates in a radial direction through the cover portion 24, the flanged portion 25 and the yoke 41 of the fixed core 20 as well as the molded body 45. The air breathing passage 55 extends in the downward direction of gravitational force from the movable-core chamber 27 to the atmosphere.

In the fourth embodiment, such extraneous material having a larger mass than that of the oil cannot easily enter the movable-core chamber 27 because of its gravity, when the oil discharged from the oil-discharge port 95 is drawn into the movable-core chamber 27 through the air breathing passage 55. In addition, the deteriorated oil as well as the extraneous material can be easily discharged from the movable-core chamber 27 to the outside through the air breathing passage 55.

Furthermore, in the fourth embodiment, as a result of elongating the air breathing passage 55, the extraneous material contained in the oil cannot easily flow into the movable-core chamber 27 because of friction between the extraneous material and an inner wall of the air breathing passage 55, when the oil discharged from the oil-discharge port 95 is drawn into the movable-core chamber 27 through the air breathing passage 55.

In addition, in the fourth embodiment, the extraneous material of magnetic material contained in the oil can be absorbed by magnetic force on the inner wall of the air breathing passage 55, when the oil flows through the air breathing passage 55.

Fifth Embodiment

Figure 7:
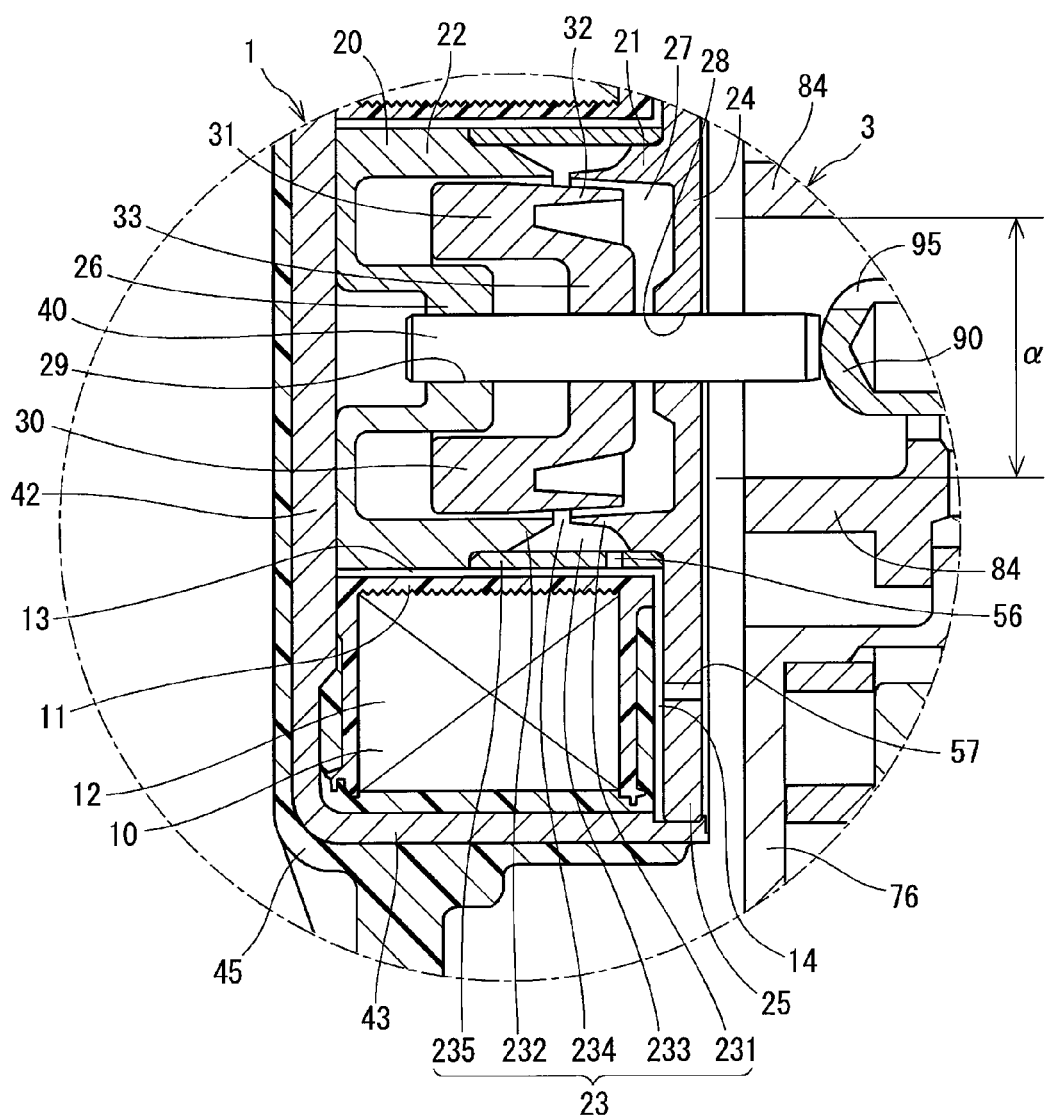
FIG. 7 is a schematic cross sectional view showing relevant portions of an electromagnetic actuator according to a fifth embodiment of the present disclosure.

An electromagnetic actuator according to a fifth embodiment will be explained with reference to FIG. 7.

In the fifth embodiment, an air breathing passage is composed of;
the gap 234 between the first and second cylindrical members 21 and 22;
the space 233 between the first and second thin-walled portions 231 and 232;
a radially-extending through-hole 56 formed in the ring member 235 of the non-magnetic material;
the gap 13 of the cylindrical shape formed between the ring member 235 and the coil 10;
the gap 14 formed between the flanged portion 25 and the coil 10; and an axially-extending through-hole 57 formed in the flanged portion 25.

In the fifth embodiment, the gap 234 between the first and second cylindrical members 21 and 22, the space 233 between the first and second thin-walled portions 231 and 232, and the radially-extending through-hole 56 formed in the ring member 235 correspond to the first passage portion. The gap 13 formed between the ring member 235 and the coil 10 and the gap 14 formed between the flanged portion 25 and the coil 10 correspond to the communicating passage portion. The axially-extending through-hole 57 formed in the flanged portion 25 corresponds to the second passage portion.

The fifth embodiment also has the same advantages to those of the above first to fourth embodiments.

Sixth Embodiment

Figure 8:
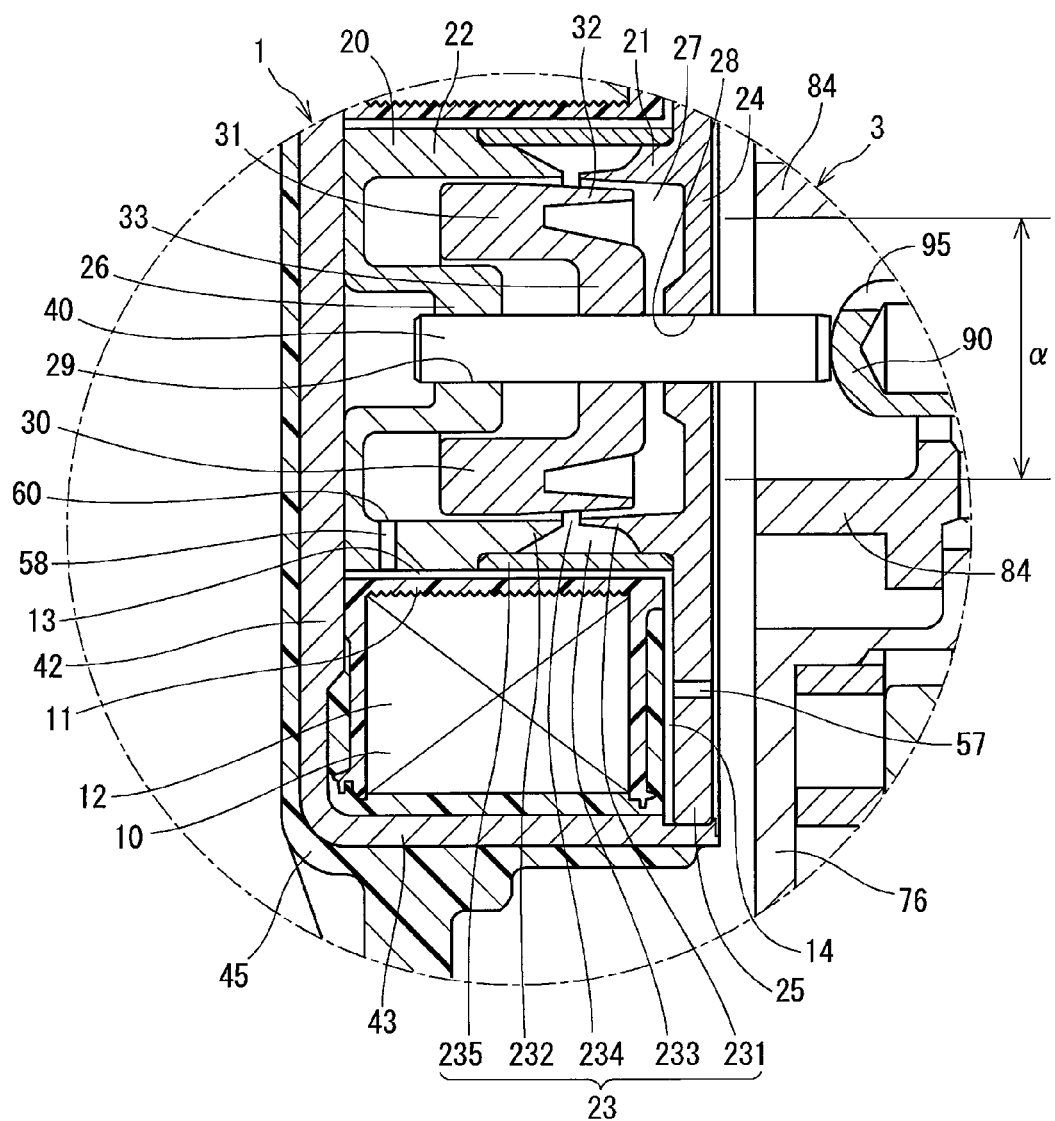
FIG. 8 is a schematic cross sectional view showing relevant portions of an electromagnetic actuator according to a sixth embodiment of the present disclosure.

An electromagnetic actuator according to a sixth embodiment will be explained with reference to FIG. 8.

In the sixth embodiment, an air breathing passage is composed of;
 a radially-extending through-hole 58 formed in the second cylindrical member 22 and extending in a radial direction;
 the gap 13 of the cylindrical shape formed between the second cylindrical member 22 (including the ring member 235) and the coil 10;
 the gap 14 formed between the flanged portion 25 and the coil 10; and
 the axially-extending through-hole 57 formed in the flanged portion 25.

An open end 60 of the radially-extending through-hole 58, which is formed in the second cylindrical member 22 on the side to the movable-core chamber 27, is located at such a position of the inner wall of the movable-core chamber 27 on a side of the movable core 30 opposite to the hydraulic control valve 3. It is, therefore, possible to elongate the air breathing passage.

In the sixth embodiment, the radially-extending through-hole 58 formed in the second cylindrical member 22 corresponds to the first passage portion. The gap 13 formed between the second cylindrical member 22 and the coil 10 and the gap 14 formed between the flanged portion 25 and the coil 10 correspond to the communicating passage portion. The axially-extending through-hole 57 formed in the flanged portion 25 corresponds to the second passage portion.

In addition, the open end 60 of the radially-extending through-hole 58, which is formed at the inner wall of the movable-core chamber 27 corresponds to the inside opening portion. An opening end of the axially-extending through-hole 57 formed at the side to the atmosphere corresponds to the outside opening portion.

The sixth embodiment also has the same advantages to those of the above first to fifth embodiments.

Seventh Embodiment

Figure 9:
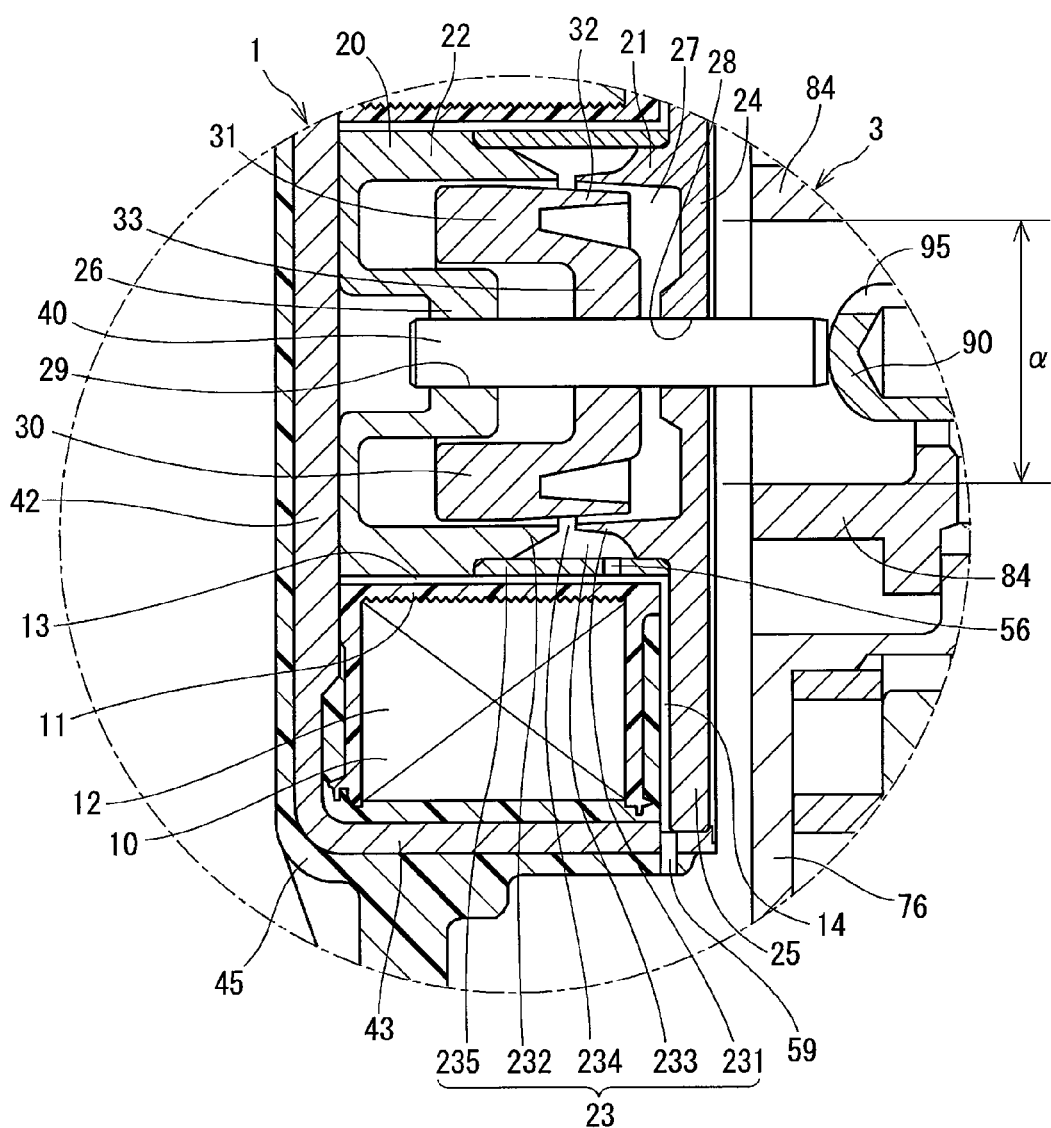
FIG. 9 is a schematic cross sectional view showing relevant portions of an electromagnetic actuator according to a seventh embodiment of the present disclosure.

An electromagnetic actuator according to a seventh embodiment will be explained with reference to FIG. 9.

In the seventh embodiment, an air breathing passage is composed of;
 the gap 234 formed between the first and second cylindrical members 21 and 22;
 the space 233 formed between the first and second thin-walled portions 231 and 232;
 the radially-extending through-hole 56 formed in the ring member 235 of the non-magnetic material;
 the gap 13 formed between the second cylindrical member 22 (including the ring member 235) and the coil 10;
 the gap 14 formed between the flanged portion 25 and the coil 10; and
 another radially-extending through-hole 59 penetrating through the yoke 41 and the molded body 45 in the radial direction.

The radially-extending through-hole 59 corresponds to the second passage portion.

The seventh embodiment also has the same advantages to those of the above first to sixth embodiments.

Eighth Embodiment

Figure 10:
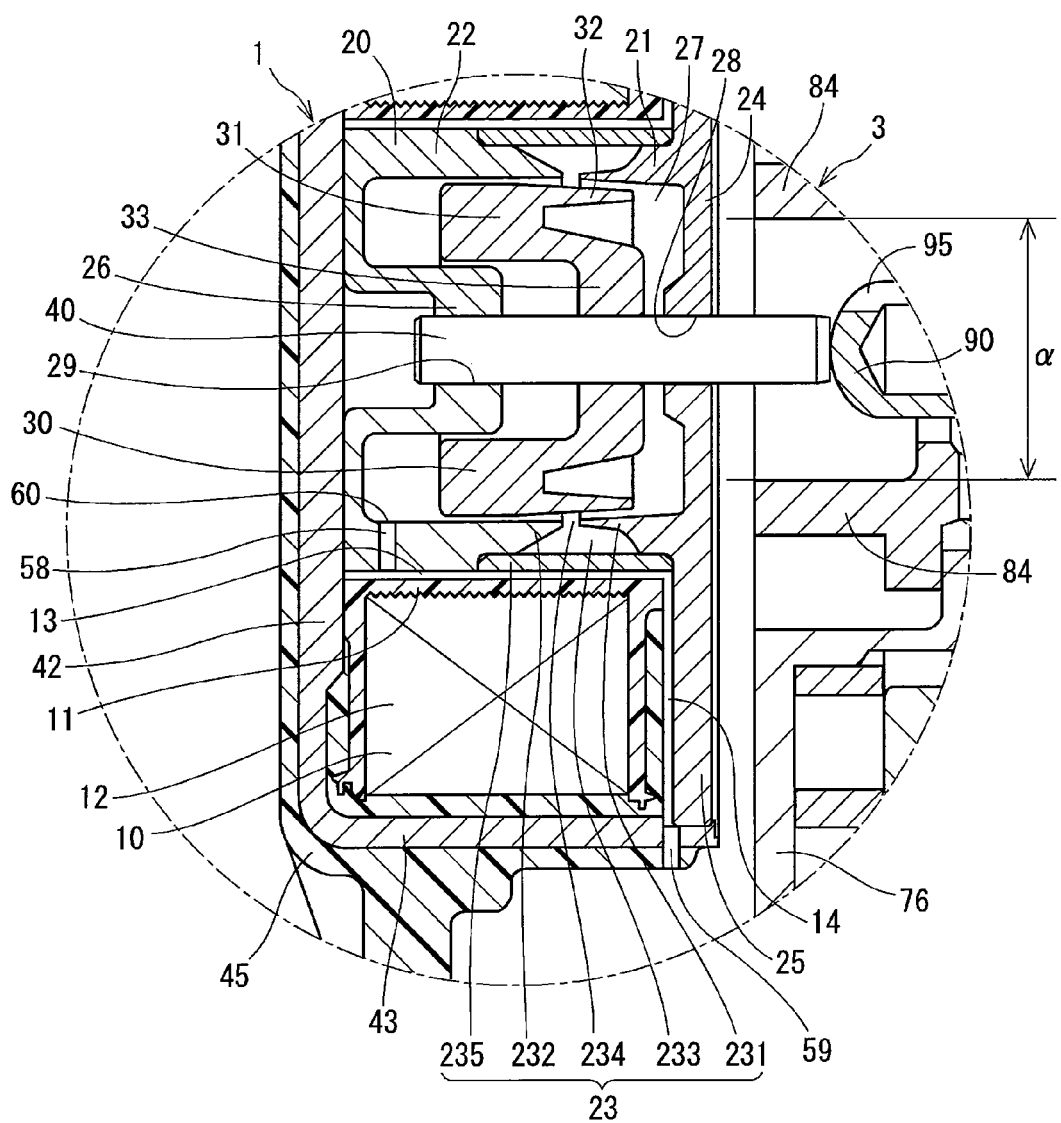
FIG. 10 is a schematic cross sectional view showing relevant portions of an electromagnetic actuator according to an eighth embodiment of the present disclosure.

An electromagnetic actuator according to an eighth embodiment will be explained with reference to FIG. 10.

In the eighth embodiment, an air breathing passage is composed of;
 the radially-extending through-hole 58 formed in the second cylindrical member 22 and extending in the radial direction;
 the gap 13 formed between the second cylindrical member 22 (including the ring member 235) and the coil 10;
 the gap 14 formed between the flanged portion 25 and the coil 10; and
 the other radially-extending through-hole 59 penetrating through the yoke 41 and the molded body 45 in the radial direction.

The eighth embodiment also has the same advantages to those of the above first to seventh embodiments.

Ninth Embodiment

Figure 11:
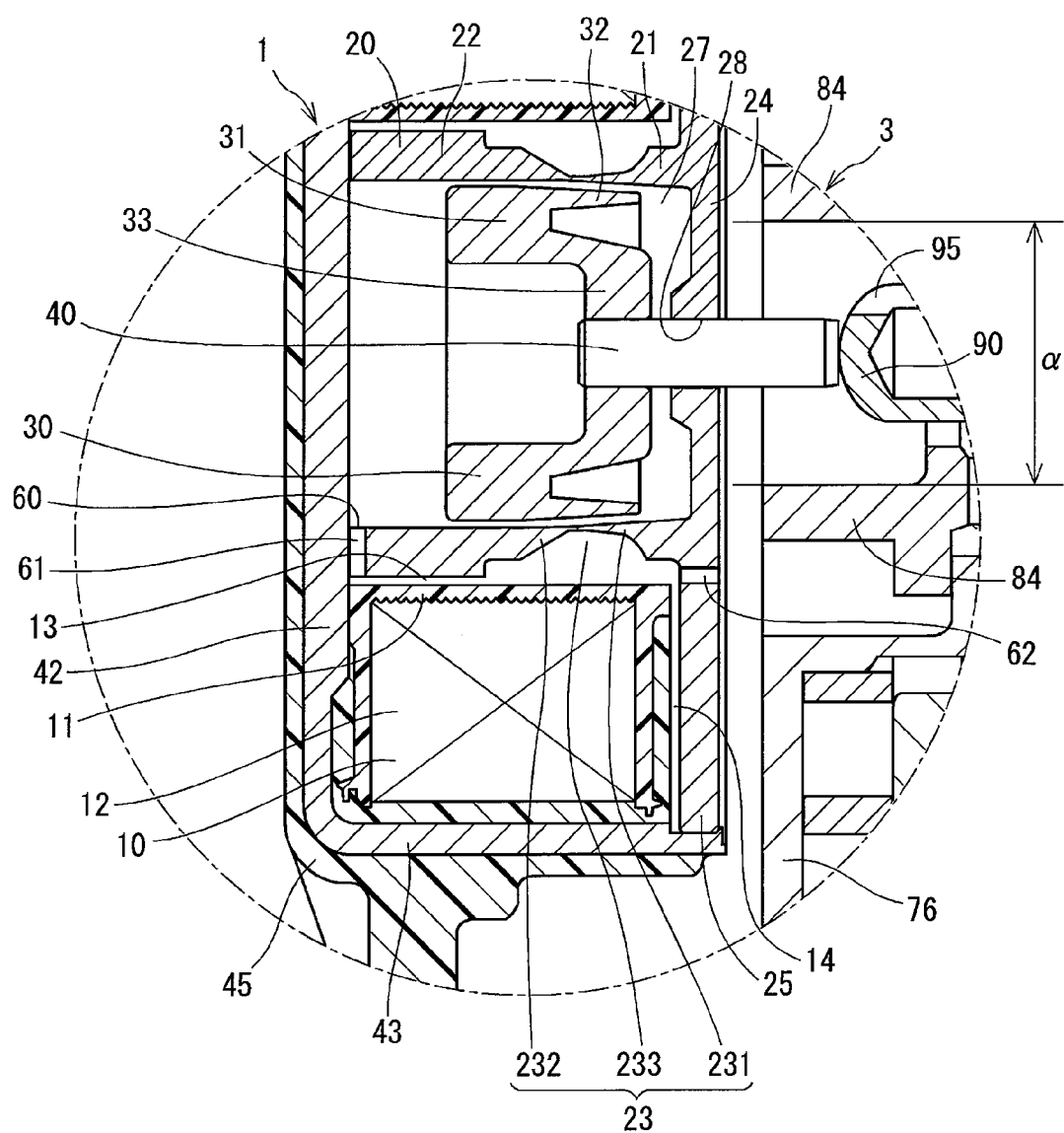
FIG. 11 is a schematic cross sectional view showing relevant portions of an electromagnetic actuator according to a ninth embodiment of the present disclosure.

An electromagnetic actuator according to a ninth embodiment will be explained with reference to FIG. 11.

In the ninth embodiment, the first cylindrical member 21, the second cylindrical member 22, the magnetic-flux restricting portion 23, the cover portion 24 and the flanged portion 25 are integrally formed as one unit for forming the fixed core 20. The fixed core 20 does not have a structure corresponding to the rod supporting portion 26 of the first embodiment.

In the ninth embodiment, the first cylindrical member 21, the second cylindrical member 22 and the magnetic-flux restricting portion 23 correspond to the cylindrical portion.

In the magnetic-flux restricting portion 23, the first and second thin-walled portions 231 and 232 are integrally formed. Therefore, the magnetic-flux restricting portion 23 does not have a structure corresponding to the ring member 235 made of the non-magnetic material in the first embodiment.

In the ninth embodiment, an air breathing passage is composed of;
 a radially-extending through-hole 61 formed in the second cylindrical member 22 and extending in the radial direction;
 the gap 13 formed between the first and second cylindrical members 21 and 22 and the coil 10; and
 an axially-extending through-hole 62 penetrating through the flanged portion 25 in the axial direction.

The open end 60 of the radially-extending through-hole 61, which is formed in the second cylindrical member 22 on the side to the movable-core chamber 27, is located at such a position of the inner wall of the movable-core chamber 27 on a side of the movable core 30 opposite to the hydraulic control valve 3. It is, therefore, possible to elongate the air breathing passage.

In the ninth embodiment, the radially-extending through-hole 61 formed in the second cylindrical member 22 corresponds to the first passage portion. The gap 13 formed between the first and second cylindrical members 21 and 22 and the coil 10 corresponds to the communicating passage portion. The axially-extending through-hole 62 formed in the flanged portion 25 corresponds to the second passage portion.

The ninth embodiment also has the same advantages to those of the above first to eighth embodiments.

In addition, in the ninth embodiment, since the fixed core 20 does not have the structure corresponding to the ring member 235, a surface area of the first and second cylindrical members 21 and 22, which is exposed to the gap 13 formed between the coil 10 and the first and second cylindrical members 21 and 22, is increased. As a result, it is possible to surely absorb the extraneous material made of magnetic material (contained in the oil flowing along the gap 13) on the outer surface of the first and second cylindrical members 21 and 22, which are made of magnetic material.

In addition, since the fixed core 20 does not have the structure corresponding to the ring member 235, the space 233 formed between the first and second thin-walled portions 231 and 232 is increased. Then, flow speed of the oil flowing through the space 233 is decreased. It is, therefore, possible to surely absorb the extraneous material made of magnetic material (contained in the oil flowing through the space 233) by the magnetic force on the outer surfaces of the first and second thin-walled portions 231 and 232.

Further Embodiments and/or Modifications

In the above embodiments, the outside opening 52 of the air breathing passage 50 is formed in the fixed core 20, the yoke 41 or the molded body 45 on the side to the atmosphere.

However, the outside opening of the air breathing passage may be formed in any portion of the actuator on the side to the atmosphere, except for the area (the circular area "α") to which the oil discharged from the oil-discharge port 95 is directly splashed.

The outside opening 52 of the air breathing passage 50 is preferably formed on the side of the actuator 1 to the valve timing control device 2, which is provided within an inner room defined by the engine cover 4, so that the oil from the oil-discharge port 95 can be surely collected to the oil pan 7.

The present disclosure should not be limited to the above embodiments and/or modifications but can be further modified in various manners (including combinations of the above embodiments) without departing from spirits of the present disclosure.

What is claimed is:

1. An electromagnetic actuator, which is provided at a position opposing to a hydraulic control valve and drives the hydraulic control valve, comprising:
    a coil for generating magnetic field when electric power is supplied to the coil;
    a fixed core having a cylindrical portion provided inside of the coil, a cover portion for closing an axial end of the cylindrical portion on a side to the hydraulic control valve, and a flanged portion extending from the cover portion in a radial-outward direction of the electromagnetic actuator;
    a movable core movably accommodated in a movable-core chamber formed inside of the fixed core, so that the movable core is movable in an axial direction of the electromagnetic actuator;
    a rod extending in the axial direction from the movable core and passing through a through-hole formed in the cover portion of the fixed core so as to push the hydraulic control valve; and
    a single air breathing passage for communicating the movable-core chamber to the atmosphere,
    wherein an inside opening portion of the air breathing passage is formed in an inner wall of the movable-core chamber, and
    wherein an outside opening portion of the air breathing passage is formed in an outer wall of the electromagnetic actuator on a side to the hydraulic control valve, and the outside opening portion is formed at such a position, which is not only out of an oil-splashing area to which oil from an oil-discharge port of the hydraulic control valve is directly splashed but also out of an area on the outer wall opposing to an inner area surrounded by a head portion of a spool of the hydraulic control valve, and
    wherein the oil is drawn into or discharged from the movable-core chamber through the air breathing passage together with air when the movable core is reciprocated in the movable-core chamber.

2. The electromagnetic actuator according to claim 1, wherein
    the inside opening portion is formed in the inner wall of the movable-core chamber at a lower-most position of the movable-core chamber in a direction of gravitational force, so that the inside opening portion is communicated to the movable-core chamber, and
    the outside opening portion is formed in the outer wall of the electromagnetic actuator at a position, which is lower than the oil-splashing area in the direction of gravitational force.

3. The electromagnetic actuator according to claim 1, wherein
    the outside opening portion of the air breathing passage is formed at a position, which is lower than the inside opening portion in the direction of gravitational force.

4. The electromagnetic actuator according to claim 1, wherein the air breathing passage is composed of:
    a first passage portion formed in the cylindrical portion of the fixed core;
    a second passage portion formed in the cover portion or the flanged portion; and
    a communicating passage portion formed at a radial-outward side of the cylindrical portion and communicating the first passage portion and the second passage portion to each other.

5. The electromagnetic actuator according to claim 4, wherein
    an outer wall surface of the fixed core is exposed to the communicating passage portion, so that extraneous material contained in the oil flowing through the air breathing passage is absorbed by magnetic force on an inner wall surface of the communicating passage portion.

6. The electromagnetic actuator according to claim 4, wherein the cylindrical portion of the fixed core is composed of;
    a first cylindrical portion formed at an axial end of the electromagnetic actuator on a side to the hydraulic control valve;

a second cylindrical portion formed at an axial end of the first cylindrical portion on a side opposite to the hydraulic control valve; and a magnetic-flux restricting portion formed between the first cylindrical portion and the second cylindrical portion, and wherein the first passage portion is formed in the second cylindrical portion.

7. The electromagnetic actuator according to claim 4, wherein the cylindrical portion of the fixed core is composed of;

a first cylindrical portion formed at an axial end of the electromagnetic actuator on a side to the hydraulic control valve;

a second cylindrical portion formed at an axial end of the first cylindrical portion on a side opposite to the hydraulic control valve; and a magnetic-flux restricting portion formed between the first cylindrical portion and the second cylindrical portion, and wherein the first passage portion is formed in the magnetic-flux restricting portion.

8. The electromagnetic actuator according to claim 4, wherein the second passage portion of the air breathing passage is opened at such an area of an outer wall of the cover portion or the flanged portion on a side to the hydraulic control valve, wherein the oil from the oil-discharge port flows down along the area.

9. The electromagnetic actuator according to claim 4, further comprising:

a yoke formed in a cylindrical shape having a bottom, the yoke covering another axial end of the cylindrical portion on a side opposite to the hydraulic control valve, the yoke covering a radial outward side-wall of the coil, and the yoke being connected to the flanged portion; and a molded body formed at an outside of the yoke, wherein the second passage portion of the air breathing passage is formed in the yoke and the molded body.

10. An electromagnetic actuator, which is provided at a position opposing to a hydraulic control valve and drives the hydraulic control valve, comprising:

a coil for generating magnetic field when electric power is supplied to the coil;

a fixed core having a cylindrical portion provided inside of the coil, a cover portion for closing an axial end of the cylindrical portion on a side to the hydraulic control valve, and a flanged portion extending from the cover portion in a radial-outward direction of the electromagnetic actuator;

a movable core movably accommodated in a movable-core chamber formed inside of the fixed core, so that the movable core is movable in an axial direction of the electromagnetic actuator;

a rod extending in the axial direction from the movable core and passing through a through-hole formed in the cover portion of the fixed core so as to push the hydraulic control valve; and at least one air breathing passage for communicating the movable-core chamber to the atmosphere, wherein an inside opening portion of the air breathing passage, or each inside opening portion of the air breathing passages, is formed in an inner wall of the movable-core chamber, and wherein an outside opening portion of the air breathing passage, or each outside opening portion of the air breathing passages, is formed in an outer wall of the electromagnetic actuator on a side to the hydraulic control valve, and the outside opening portion or each of the outside opening portions is formed at such a position out of an oil-splashing area to which oil from an oil-discharge port of the hydraulic control valve is directly splashed, wherein none of the outside opening portions is located at the position within the oil-splashing area, and wherein the oil is drawn into or discharged from the movable-core chamber through the one or multiple air breathing passages together with air when the movable core is reciprocated in the movable-core chamber.

11. An electromagnetic actuator, which is provided at a position opposing to a hydraulic control valve and drives the hydraulic control valve, comprising:

a coil for generating magnetic field when electric power is supplied to the coil;

a fixed core having a cylindrical portion provided inside of the coil, a cover portion for closing an axial end of the cylindrical portion on a side to the hydraulic control valve, and a flanged portion extending from the cover portion in a radial-outward direction of the electromagnetic actuator;

a movable core movably accommodated in a movable-core chamber formed inside of the fixed core, so that the movable core is movable in an axial direction of the electromagnetic actuator;

a rod extending in the axial direction from the movable core and passing through a through-hole formed in the cover portion of the fixed core so as to push the hydraulic control valve; and only one air breathing passage for communicating the movable-core chamber to the atmosphere, wherein an inside opening portion of the air breathing passage is formed in an inner wall of the movable-core chamber, and wherein an outside opening portion of the air breathing passage is formed in an outer wall of the electromagnetic actuator on a side to the hydraulic control valve, and the outside opening portion is formed at such a position, which is not only out of an oil-splashing area to which oil from an oil-discharge port of the hydraulic control valve is directly splashed but also out of an area on the outer wall opposing to an inner area surrounded by a head portion of a spool of the hydraulic control valve, and wherein the oil is drawn into or discharged from the movable-core chamber through the air breathing passage together with air when the movable core is reciprocated in the movable-core chamber.

* * * * *